July 26, 1938.  W. B. BIDWELL, 2D  2,124,604
INTERNAL COMBUSTION ENGINE
Original Filed Oct. 25, 1935  3 Sheets-Sheet 1

Inventor:
William B. Bidwell, II
by G. F. McDougall.
Attorney.

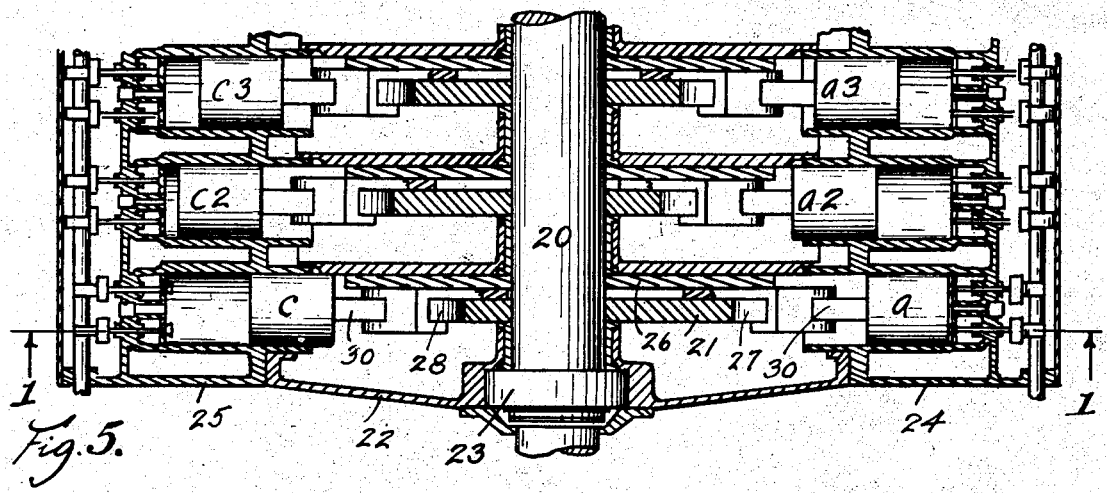
Fig. 5.
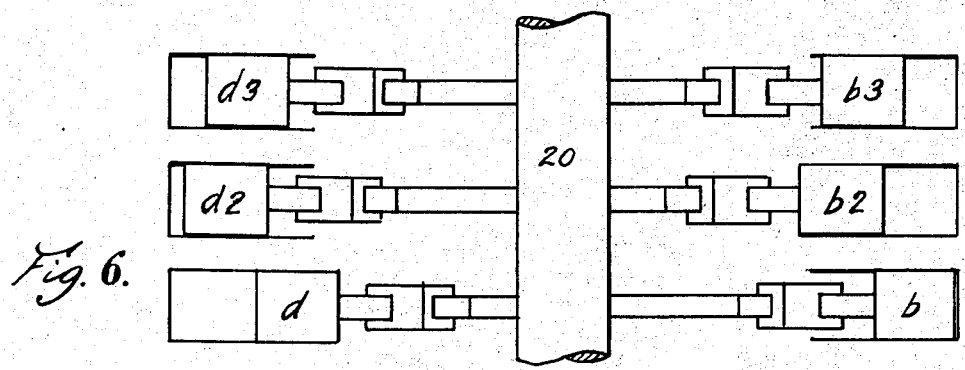
Fig. 6.
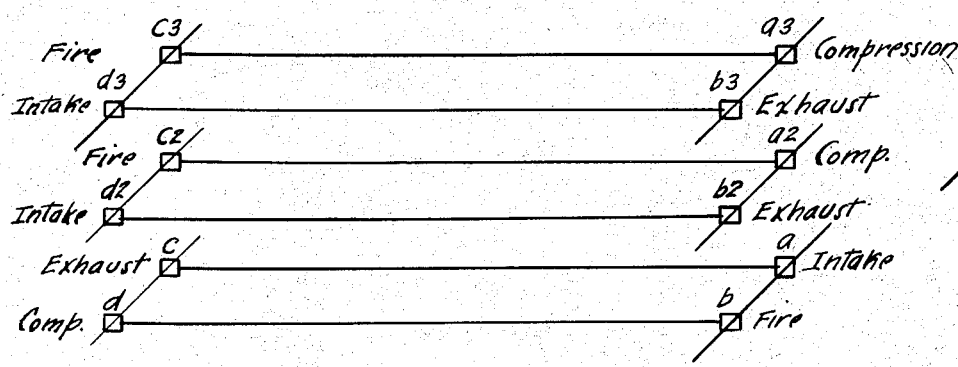
Fig. 7.
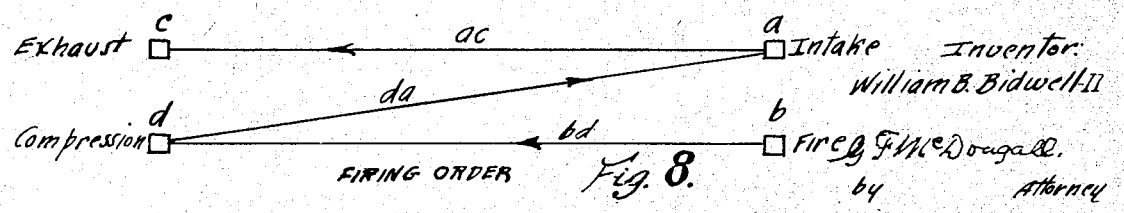
FIRING ORDER  Fig. 8.
Inventor:
William B. Bidwell II
by F. McDougall
Attorney July 26, 1938.  W. B. BIDWELL, 2D  2,124,604
INTERNAL COMBUSTION ENGINE
Original Filed Oct. 25, 1935   3 Sheets-Sheet 3
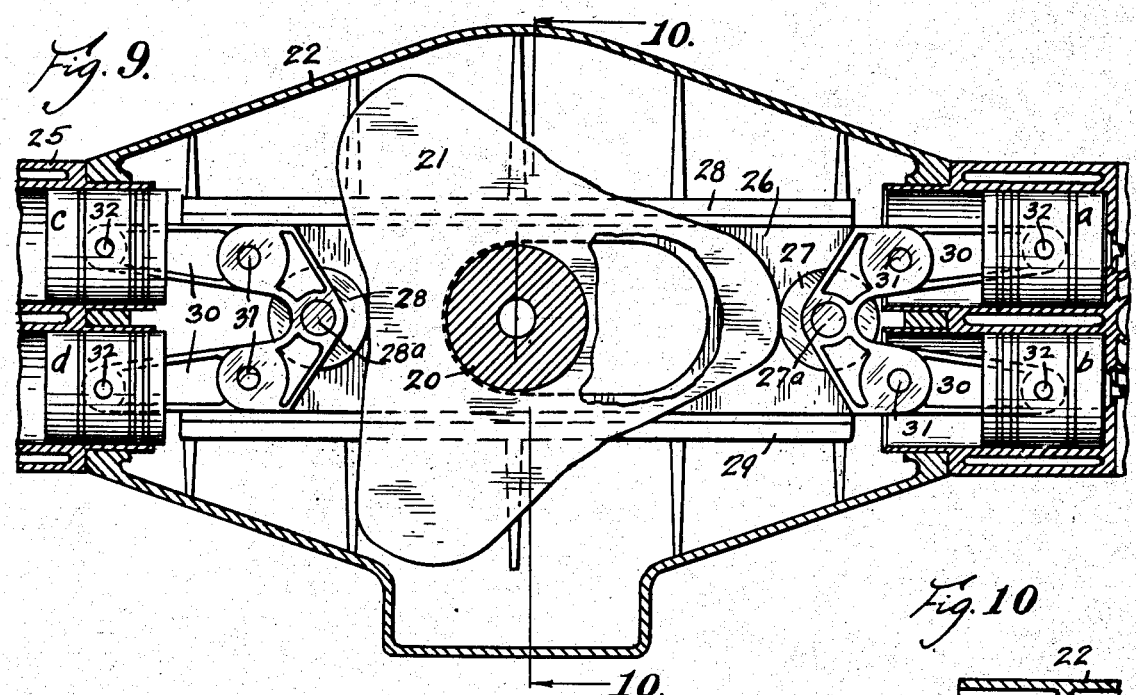
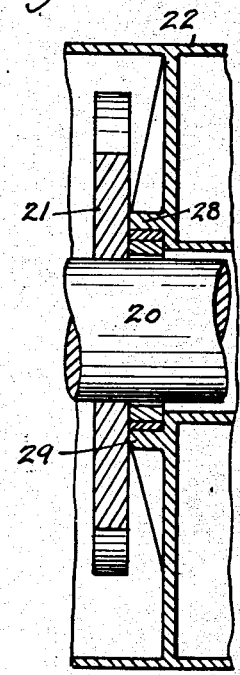
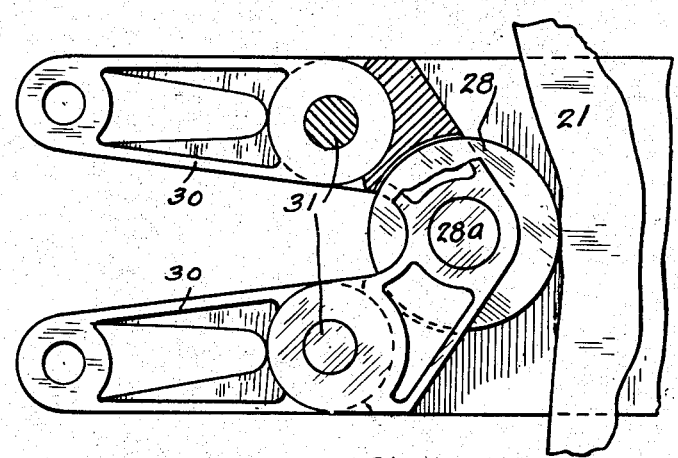
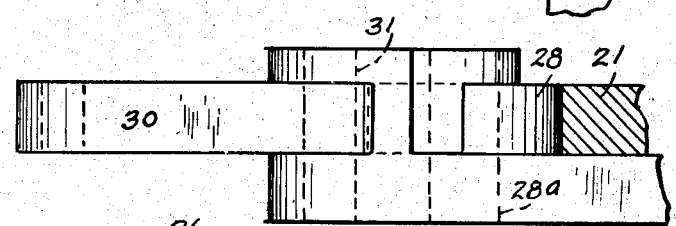
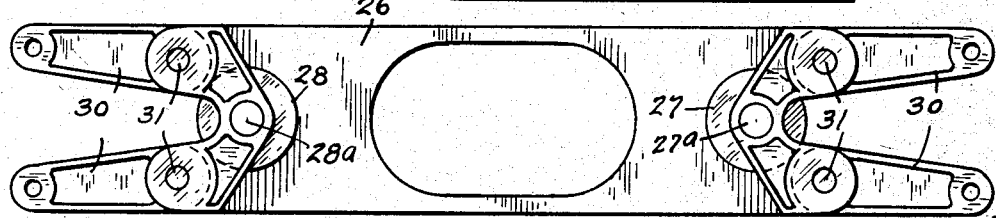
Inventor:
William B. Bidwell II
by G. F. McDougall
Attorney Patented July 26, 1938

2,124,604

UNITED STATES PATENT OFFICE 2,124,604

INTERNAL COMBUSTION ENGINE

William B. Bidwell, II, Portland, Oreg., assignor of one-half to William C. Bidwell, Portland, Oreg.

Application October 25, 1935, Serial No. 46,696
Renewed June 13, 1938

6 Claims. (Cl. 74—55)

My invention relates to internal combustion engines in which a three lobed cam is used by way of a reducing mechanism, to utilize the efficiency normally characteristic of high piston speeds in internal combustion engines, with a power take-off shaft having a less speed, in this case one-third, which amounts in effect to a reducing motion without the disadvantages inherent in gear and pinion structures, the advantages of which have been visualized for a long time, but which, so far as I am aware, have never been successfully realized notwithstanding a number of patented embodiments of different forms, which proved impracticable, principally on account of localized high thrust moments.

One of the obstacles to successful application of this principle, hitherto regarded as insurmountable, has been the apparent necessity of placing the thrust due to the combustion of fuel at some point beyond the open end of the engine cylinder, thus placing an unsupportable angular thrust moment on the piston with respect to the walls of the cylinder.

One of the objects of my invention is to overcome this by a novel construction, hereinafter more completely set forth in detail.

Another object of my invention is to so place the axis of the engine shaft or cam shaft with respect to the thrust of the pistons on firing stroke that in effect the engine is always well past center when the firing impulse reaches the cam as a moment of revolution.

The forces of greatest magnitude in an internal combustion engine are, first the power stroke and, second the compression stroke which is of opposite character and must be subtracted from the power stroke before net power is available to perform useful work.

Another object of my invention is to deliver only the net power to the shaft, as will be hereinafter explained, thus decreasing thrust and bearing loads on the power shaft, bending moments on the shaft proper and, indirectly, stresses set up in engine frame structures.

Accomplishing these and other objects that will be apparent from the specification and drawings herewith, which will be clear to those to whom this specification is addressed, is the purpose of the present invention.

In the drawings,—

Fig. 5 is a section in plan of my engine which shows a multiple of the series of power units illustrated in the first four figures and for convenient reference may be considered taken on the line 5—5 of Fig. 1.

Fig. 6 is a diagrammatic representation of the lower bank of engines that will be directly underneath those shown in Fig. 5. The purpose of this view is to show the relative positions of the operating units of the lower bank assuming that the upper bank units are in the position shown in Fig. 5.

Fig. 7 is a diagrammatic representation of the power moments of the 12 cylinder engine shown in Figs. 5 and 6 as viewed from a 45 degree angle, hereinafter explained in detail.

Figure 1:
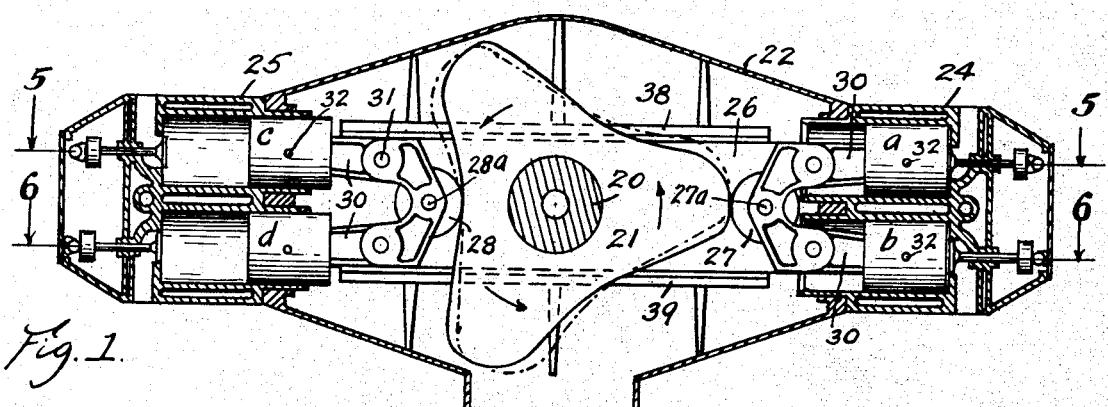
Figs. 1, 2, 3 and 4 are transverse sections of my new engine taken on the line 1—1 of Fig. 5 and showing four different positions of the engine to illustrate cycles of operation as will be hereinafter more completely described in detail.
Figure 2:
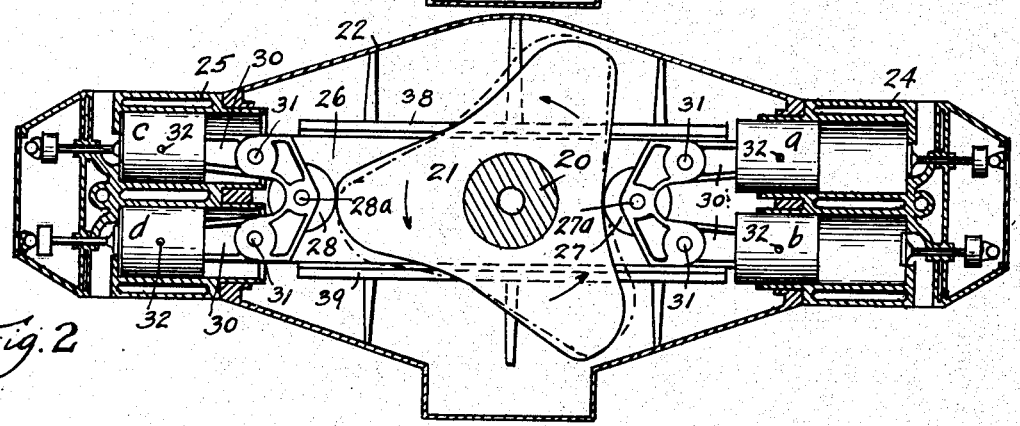
Figure 3:
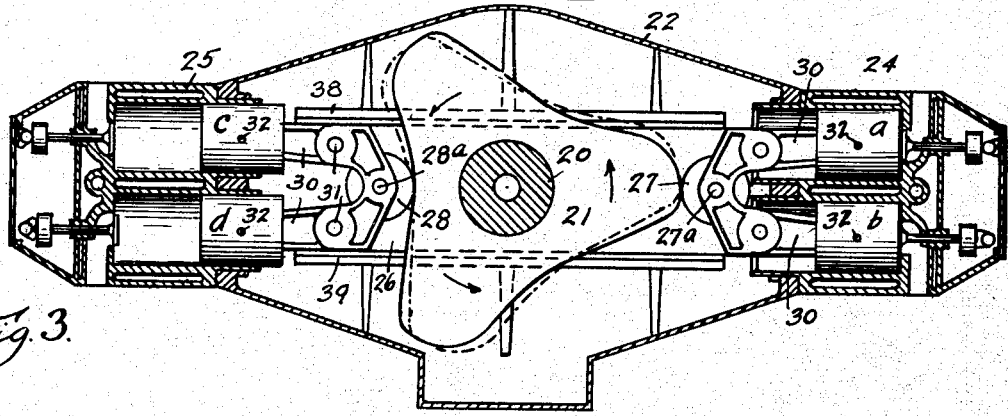
Figure 4:
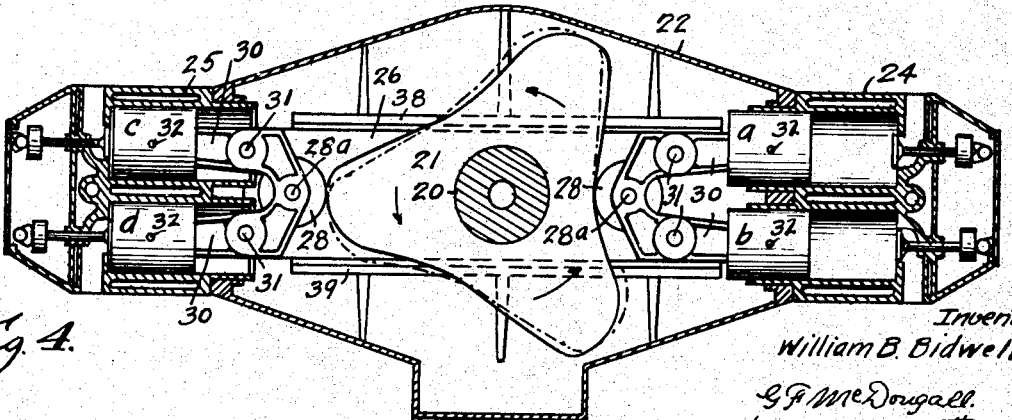

Fig. 8 shows a firing cycle of the structure shown in Fig. 1 and will be characteristic of each set of four engine units of a group comprising a complete engine unit. The purpose of this view is to illustrate that when each engine fires an engine opposite to it is always in compression. Hence the power of the firing unit is partly used in compression and partly applied to the turning moment of the shaft through the cam, and the energy required to compress the opposed unit to firing position is not transmitted through the shaft or cam.

Fig. 9 is an enlarged view of the central portion of Fig. 1 with the two ends broken away and with a broken opening through the cam to show the necessary construction of the crosshead with relation to the shaft.

Fig. 10 is a section on the line 10—10 of Fig. 9.

Fig. 11 is an enlarged view of one end of the crosshead with a portion of the cam in proper relationship, and with the articulation arms mounted thereon. This figure shows the arcuate surface of the cam at the point of contact of the cam roller required by the arc at the terminus of the directly opposite lobe of the cam as hereinafter pointed out.

Fig. 12 is an orthographic projection of Fig. 11.

Fig. 13 is a view of the crosshead detached from the structure shown in Fig. 9.

These drawings delineate three, four cylinder engines arranged to deliver power to a common shaft, the three cams being spaced around the shaft to equalize power delivery. Considering the drawings, Figs. 1 to 4 inclusive, the power shaft 20 has a three lobed cam 21, made rigid therewith. A cam case 22, is provided with suitable bearings 23, (Fig. 5), so that the shaft 20, is rotatable within the cam case.

Mounted at opposite ends of the cam case 22, are cylinder blocks 24 and 25, diagrammatically shown to be provided with valve gear, which will not be further described since it does not form a part of the invention to be claimed in this application.

Pistons *a* and *b* are movably arranged in the cylinder block 24, and pistons *c* and *d* are movably arranged in the known manner within the cylinder block 25.

A crosshead 26, is provided with two cam rollers 27 and 28 mounted for revolution upon the bearings 27a and 28a and so spaced that they will be in running contact with the cam 21 at all points during a complete revolution of the cam, for the purpose of translating the rectilinear reciprocating motion of the crosshead 26 into a rotary motion of the cam 21.

The crosshead slides 38 and 39 confine the crosshead to a strict rectilinear path under the impulse of power thrusts from the several engine units of the set of four (Fig. 1) and in part guide the compression thrusts of the same engine units during their operating cycle so that no angular thrust moments appear between the walls of the cylinder and the surface of the pistons.

To further insure against thrust moments appearing in 31 destructive magnitude on the piston cylinder surfaces, articulation arms 30 (all being given the same numerical designation because they are identical) are pivotally attached to the crosshead at and to the piston pin 32 (see Fig. 1).

This is an important item of construction in this type of engine for the reason that when operating temperatures are attained the distance from center to center of cylinders at any firing end will be different by some thousandths of an inch than when the engine is at non-operating uniform temperature. Hence without the provision of the articulation arms 30, a very heavy thrust load would appear between the pistons and their cylinder walls; but with this construction practically the only load will be that of the springiness of the well known piston ring which is intended to be used herein but which has not been shown in these drawings since they will be understood to be present.

As is well known to those familiar with the design of internal combustion engines, the forces of greatest magnitude which must be controlled and utilized are first, those of the power stroke of the engine, and second, the power required for compression just before the power stroke begins.

By the novel arrangement of my engines, each cylinder and piston being considered an engine, I am able to subtract the power required for a compression stroke from an engine delivering a power stroke and deliver the remainder to the power delivering part such as a shaft without being compelled to first impress the power into the shaft, entailing heavier bearing loads and other disadvantageous moments, and then take it off again to use for compressing a charge of air in another engine.

This is explained by comparing Fig. 8 with Fig. 1. Engine "*b*" will be about to deliver its power stroke designated by "fire" in Fig. 8; engine "*d*" will make its compression stroke simultaneously with the power stroke of engine "*b*" (engine "*c*" being on exhaust and engine "*a*" on intake strokes). Thus it is clear that the power required for compression in engine "*d*" is delivered on a straight line from engine "*b*" through the crosshead as indicated by the straight line *b—d* and does not influence the shaft 20 which merely receives the surplus through the cam 21.

Engine "*b*" having completed the delivery of its power stroke and engine "*a*" having completed its intake stroke simultaneously, engine "*d*" is then ready to fire while engine "*a*" will be in compression and engine "*c*" on its intake stroke. The power required to compress engine "*a*" will then be delivered along the line *d—a* at small angle with respect to the crossheads, and very effective as to the application of thrust and resistance.

When engine "*a*" fires the compression of engine "*c*" will be applied along the line *a—c*, again a straight line like *b—d*, and when engine "*c*" fires the transmission of power to compress engine "*b*" is applied along the line *c—b*, which is an angle similar to the line *d—a*, and thus it is seen that for each completed cycle one-half of the thrusts absorbed by compression are in a direct line and the other half are at a low angle.

By observing the position of the cam 21 when a diagonal thrust is being delivered it will be apparent that the angularity of the thrust is in all cases taken by the cam and translated into turning moment instead of appearing as load at the crosshead slipping surfaces.

An important feature of my new engine is that the terminus of each lobe of the cam 21 is a short arc having the center of the cam as its center of radius and that a corresponding arcuate portion is placed opposite each lobe terminus in the throat between lobes.

This engine is intended to run at extremely high piston speed and the inertia of the air normally prevents filling the cylinders on the intake stroke with air at suitable density unless several pounds per sq. inch of supercharging pressure is employed.

It is intended to use superchargers with my new engine but the fact that my engines come to a full stop for approximately 5 degrees of revolution of the cam 21, at the end of each stroke whether into or out of the cylinder, enables me to get a substantially higher atmospheric tension within the cylinder under any conditions than can be obtained without it.

This has been illustrated in the drawings in Figs. 1 to 4 inclusive in which the cam 21 is shown in all of the figures with its relation to the engine what it will be when the firing or power stroke actually commences, and with dotted outlines showing the position that the cam must move to, before the power stroke begins to be effective.

With the engines in this position it will be understood that the cam has already advanced about 2½ degrees with the engines at rest and that it will have to advance another 2½ degrees before the firing stroke can become effective. This latter improves flame propagation in the engine that is firing and is utilized as additional time to fill the engine that is completing its suction stroke. Obviously scavenging will also be improved.

The purpose of Figures 10 to 13 inclusive is illustrating the adaptability of the design to attain minimum reciprocating weights, so essential with high piston speeds. The articulation arms are quite short, hence may be skeletonized as shown in Fig. 11 or made with a thin web as shown in Fig. 13 and will carry the greater part of the power developed by the engine units directly to the cam through the close coupled cam roller. The crosshead proper can be skeletonized, even more than shown, with safety since its duties reach their maximum when carrying the compression load of a piston reaching firing position.

The engine, as shown in Fig. 1, lends itself readily to multiple construction, Fig. 5, with a practically continuous power flow pattern as shown in Fig. 7.

Fig. 7 is a diagrammatic plot showing the firing order of the twelve cylinder motor indicated by Figs. 5 and 6 composed of three rectangular groups like Fig. 1 and its purpose is to illustrate the practically continuous flow of power possible as virtue of the novel arrangement of engine units shown in Figs. 1 to 4 inclusive, to be realized when as many as three of such units are arranged as indicated. There are one and a half power impulses delivered by each piston-cylinder unit per revolution of the cam in the 4 cycle assembly shown.

In the diagram the near upper bank of engine units, Fig. 5, are indicated by the letters *a* and *c* which agree with the indices used in Fig. 1. The other top units are indicated by *a2*, *a3*, *c2* and *c3* respectively.

The near bottom units are indicated by the letters *b* and *d* to agree with the designation given in Fig. 1 and with numerical suffixes *b2*, *b3* and *d2* and *d3* respectively to indicate other bottom units.

The firing order is indicated by the legends in Fig. 7, it being obvious that in the position shown *b* fires first and *d* will follow, but between them *c3* will fire and so forth. Obviously the firing order may be changed but it is not believed to be advantageous to depart from the system shown.

The overlap of power impulses gives a practically flat power curve and the opposition of impulses relieves the cam shaft of bending moments to a very remarkable degree, particularly when it is remembered that the compression stroke of a given unit is achieved by almost straight line power from an opposed unit and what may be called the back side of the cam lobe, the surface indicated by numeral 50, Fig. 1, does no work.

Having disclosed my invention so that those familiar with the art to which it appertains may make and use it, what I claim as new and desire to secure by Letters Patent, is,—

1. An internal combustion engine of the single cam type comprising two pairs of opposed engine units, the axes of said pairs being parallel, and normal to and equally spaced on opposite sides of the transverse axis of the cam, a guided crosshead, and articulated connections between the engine units and the cross head.

2. An internal combustion engine of the single cam and crosshead type comprising two pairs of opposed engine units, in parallel relationship, the axes of said pairs being equidistantly spaced from a line drawn at right angles to the axis of revolution of the cam, and articulated connections between the engine units and the crosshead.

3. A combustion engine comprising four engine units arranged in rectangular form with opposed pairs of engine units spaced apart in the same plane, a single cam mounted for revolution centrally of the rectangle, a crosshead reciprocably movable with respect to the cam, articulated connecting means between the engine units and the crosshead and a thrust roller spaced between the axes of the engines at each end of the crosshead for translating reciprocating motion of the crosshead into moments of revolution of the cam.

4. In an internal combustion engine of the character described, two pairs of opposed reciprocating engine units in spaced relationship in the same plane, a single cam mounted for revolution with its axis spaced between the axes of the engine units and normal thereto and crosshead with articulated connecting rod means for changing the reciprocating motion of said engine units to moments of revolution of said cam.

5. A four cylinder internal combustion engine comprising an engine case, a multilobed cam mounted for revolution in said case, a substantially rectangular crosshead reciprocably mounted with respect to the cam, a thrust roller mounted at each end of the crosshead for cam contact on a line normal to the axis thereof and engine pistons articulated to each of the four corners of the crosshead.

6. A four cylinder internal combustion engine comprising a cam case, a cam mounted for revolution in the case, a pair of engines in side by side relationship at each end of the case that are equally spaced from a line normal to the axis of the cam, a reciprocably mounted crosshead in the case, a thrust roller positioned at each end of the crosshead between the axes of the engines and pivoted connecting rods between the engines and the crosshead.

WILLIAM B. BIDWELL, II.